United States Patent [19]

Meeker et al.

[11] 4,413,820
[45] Nov. 8, 1983

[54] SHEET HANDLING APPARATUS AND METHOD

[75] Inventors: James A. Meeker; Christopher J. Jackson, both of Toledo, Ohio

[73] Assignee: Libbey-Owens-Ford Company, Toledo, Ohio

[21] Appl. No.: 317,315

[22] Filed: Nov. 2, 1981

[51] Int. Cl.³ .............................................. B65H 5/02
[52] U.S. Cl. ...................................... 271/101; 271/9; 271/35; 271/184; 271/225
[58] Field of Search .................. 271/10, 35, 225, 177, 271/184, 271; 414/42; 53/157

[56] References Cited

U.S. PATENT DOCUMENTS

| 3,218,066 | 11/1965 | Halberschmidt | 271/225 |
| 3,835,620 | 9/1974 | Boltz | 53/157 |
| 3,910,425 | 10/1975 | Mahara | 414/42 |
| 3,964,953 | 6/1976 | Mitchard | 271/9 X |
| 4,316,565 | 2/1982 | Hodgkinson | 271/184 X |

Primary Examiner—Richard A. Schacher
Attorney, Agent, or Firm—Collins, Oberlin & Darr

[57] ABSTRACT

An apparatus for positioning an interleave on a finished sheet product prior to transferring and depositing the latter in a stacked relation. The apparatus includes a stripper means for removing the lowermost interleave from a stack of such interleaves and advancing the same on a conveyor arrangement to a pick-up station whereat the interleave is raised into engagement with a pair of gripping arms of a reciprocal shuttle. The shuttle transports the interleave to a forward position in vertically spaced relation to the sheet product for subsequent deposit thereon prior to removal of the sheet article along with the overlying interleave by a transfer apparatus.

12 Claims, 8 Drawing Figures

SHEET HANDLING APPARATUS AND METHOD

BACKGROUND OF THE INVENTION

The present invention relates generally to the sheet material handling art and, more particularly, to a method of and apparatus for automatically providing fragile sheet articles with separator or buffer sheets.

In the production of certain sheet articles, such as bent glass sheets for use as automotive windshields for example, means are usually provided at the take-off end of an assembly line for removing the finished products one at a time therefrom and depositing the same in a stacked relation on a buck or other suitable storage or transport device for subsequent packaging. Conventionally, a suitable parting agent or protective separator, commonly known as an "interleave", is placed between adjacent sheets to prevent scratching, marring or other damage to the surfaces of the finished glass sheets. While sheets of paper have been widely employed as interleaves, more recent techniques utilize a plastic sheet preferably formed of polystyrene, for example. Customarily, these plastic sheets have been manually inserted in place between adjacent sheets, such manual and arduous operations seriously impairing the efficiency in a mass production operation and adding materially to labor and production costs.

SUMMARY OF THE INVENTION

Accordingly, it is the primary object of the present invention to overcome the above-noted shortcomings by providing a new and useful apparatus for and method of automatically positioning an interleave on a finished sheet product prior to transfer of both from one location to another in a stacked relation.

It is another object of this invention to provide in the foregoing apparatus a novel arrangement for stripping a single interleave from a stack of such interleaves for conveyance to the product transfer station.

It is a further object of the present invention to provide in the foregoing apparatus a shuttle device for transferring a single interleave from an interleave pick-up position to an interleave deposit position.

The foregoing and other objects, advantages, and characterizing features of this invention will become clearly apparent from the ensuing detailed description thereof considered in conjunction with the accompanying drawings wherein like reference characters denote like parts throughout the various views.

DETAILED DESCRIPTION OF THE PREFERRED EMBODIMENT

Figure 1:
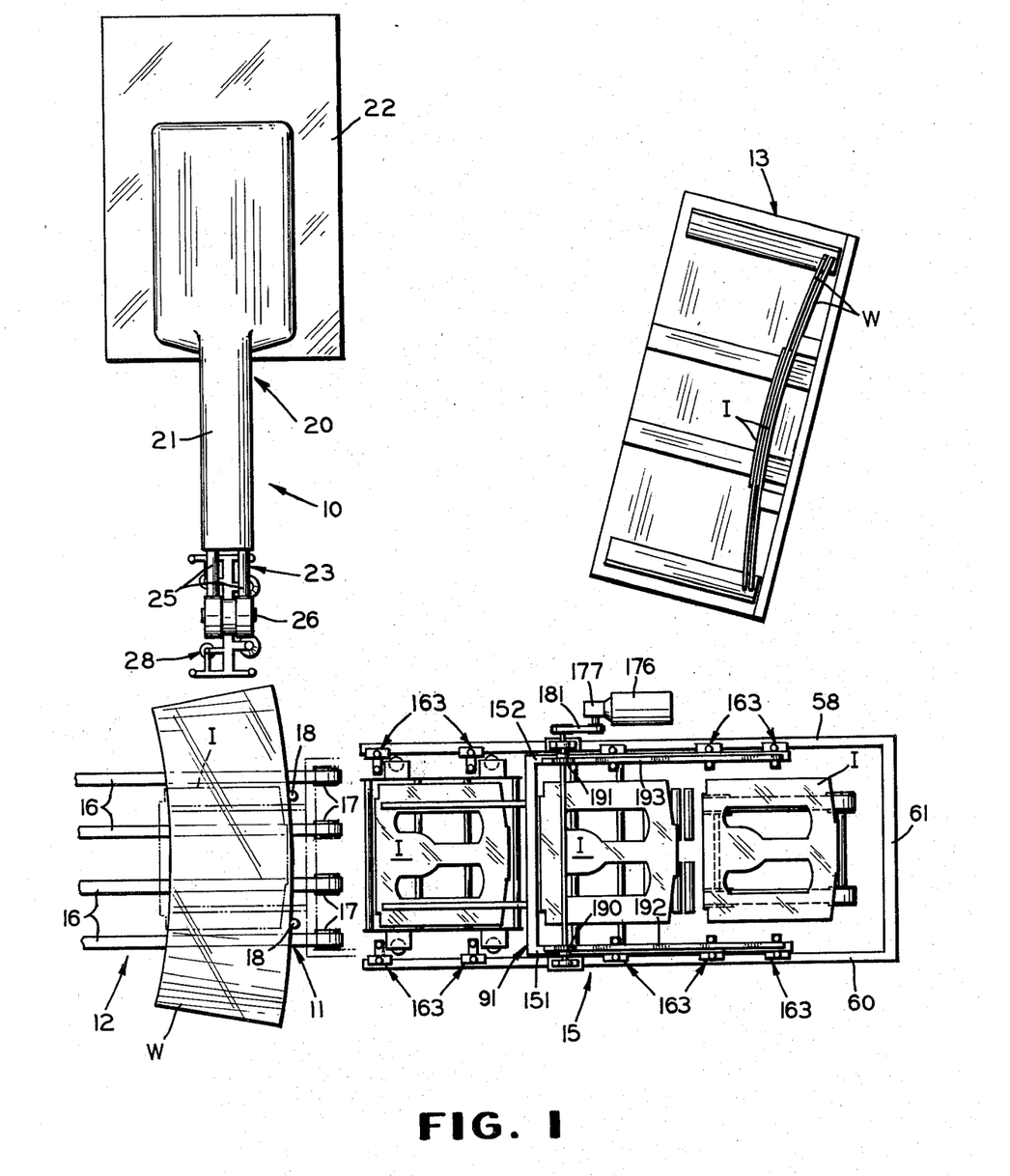
FIG. 1 is a top plan view of a material handling system embodying certain novel features of this invention.

Referring now in detail to the illustrative embodiment depicted in the accompanying drawings, there is shown in FIG. 1 a sheet material handling apparatus, generally designated 10, adapted to remove a finished glass sheet product W singly from the take-off end 11 of a conveyor system 12, which is adapted to support and convey successive glass sheet products W in a horizontal plane along a predetermined horizontal path. The apparatus 10 includes transfer means for removing the individual sheets from the conveyor system 12 and depositing them in another area in a substantially vertical attitude in a stacked relation onto a storage or transport buck 13. In order to preclude the scratching, marring or any other surface damage to the stacked sheets, a buffer sheet or interleave I is inserted between adjacent sheets W. While it will be convenient to describe the apparatus of the present invention in connection with the handling and transfer of glass sheets and, more specifically windshields W, it should be understood that the novel apparatus of this invention is not restricted to such use, but has utility in any sheet material handling operation where it is desired to stack such sheets and interpose an interleave between adjacent sheets for protective purposes. An interleave inserting or positioning apparatus, comprehensively designated 15, constructed in accordance with this invention and which will hereinafter be more fully described, is provided for automatically delivering a single interleave I from a supply of such interleaves onto the windshield W just prior to removal by the transfer apparatus 10.

More specifically, the conveyor system 12 includes the hereinbefore mentioned take-off end 11 and is formed of a series of laterally spaced conveyor belts 16 entrained about drive pulleys (not shown) connected to a suitable drive (also not shown) and idler pulleys 17. A pair of laterally spaced locator stops 18 are mounted on the frame of the conveyor system 12 adjacent the trailing edge of the active run thereof to locate the individual windshields W in the proper position for removal by transfer apparatus 10.

The transfer apparatus 10 is in the form of an industrial robot 20 of the type known in the art and includes a pivotal beam or boom 21 mounted in turret fashion on a fixed base member 22 for pivotal movement thereon about both a vertical and a horizontal axis. Boom 21 is provided with an axially extensible arm 23 formed of a pair of laterally spaced rods 25 supporting at their distal ends, as by pivot pin 26, a mechanical appendage 27 adapted to support a transporting frame, generally designated 28.

Figure 7:
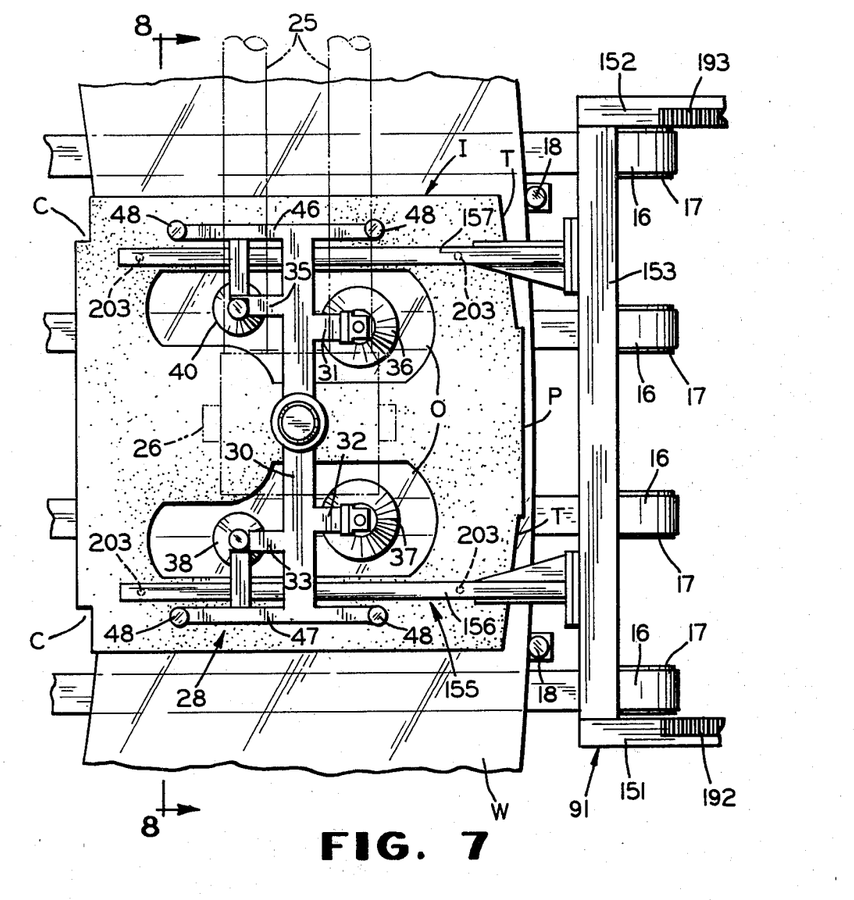
FIG. 7 is a fragmentary top plan view, showing the transfer arm of an industrial robot in position to pick up a sheet article.
Figure 8:
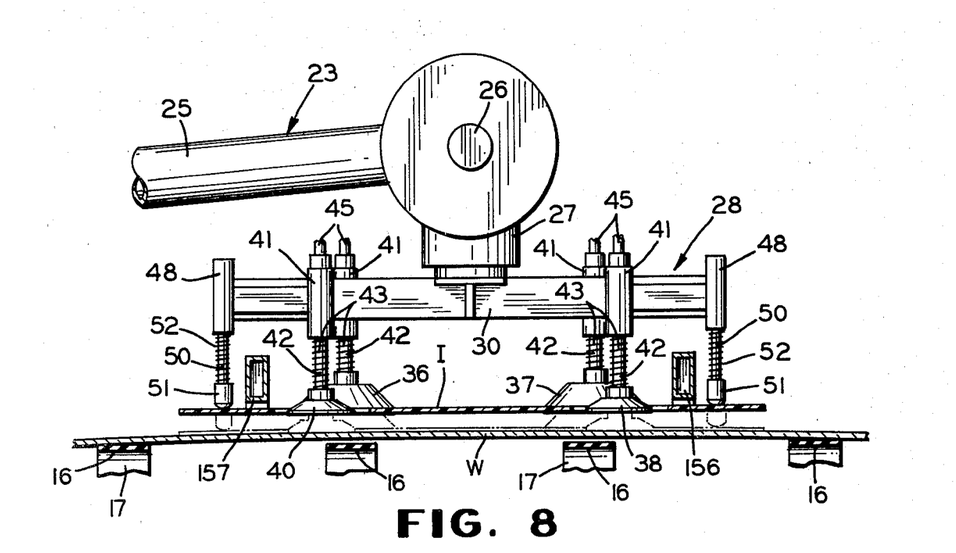
FIG. 8 is a vertical sectional view, taken along the line 8—8 of FIG. 7.

As best shown in FIGS. 7 and 8, the transporting frame 28 comprises an elongated structural member 30 having a plurality of support arms 31, 32, 33 and 35 extending laterally therefrom for supporting vacuum cups 36, 37, 38 and 40, respectively, as will presently be described. Each of the support arms 31-35 terminate in a bushing or collar 41 for telescopically receiving a hollow rod 42 supporting the associated vacuum cup. Each of the cups 36-40 normally is biased away from its respective collar by a spring 43 disposed about the hollow rod 42 between the cup and its collar 41. Each of the hollor rods 42 is connected to a vacuum line 45, in turn connected to a suitable source of vacuum (not shown). Thus, a suction force is established through the several lines 45 and associated rods 42 to the several cups 36–40 for securing and holding the windshield W onto the frame 28 during glass pick-up and transfer. Fluid under pressure also can be directed to the several cups through the same lines establishing the vacuum and is operative to displace a sheet of glass from the cups when depositing the same at another location.

A pair of transversely extending support arms 46 and 47 are rigidly secured to the opposite ends of member 30, each arm terminating in collars 48 at the opposite ends thereof. The collars 48 telescopically receive rods 50 carrying bumper pads 51 at the distal ends thereof. Each of the pads 51 is biased away from its associated collar 48 by a spring 52 mounted therebetween on the rod 50 for a purpose that will hereinafter become apparent.

It can be appreciated that when automatically stacking windshields or any other glass sheets for storage or shipment, care must be exercised in avoiding the scratching or marking of the fragile sheet surfaces, which must meet strict optical requirements. One expedient for protecting the surfaces is to insert an interleave between adjacent sheets. While various types of sheet material and parting agents have been utilized for interleaving purposes in the past, the use of somewhat rigid plastic interleaves, such as those formed of polystyrene for example, have been widely accepted in present-day practices. The insertion of such plastic interleaves between adjacent glass sheets has conventionally been done manually, requiring additional attendants at the end of each assembly line and adding significantly to production costs. Moreover, these polystyrene interleaves are extremely lightweight, rendering them difficult and awkward to handle manually.

Figure 2:
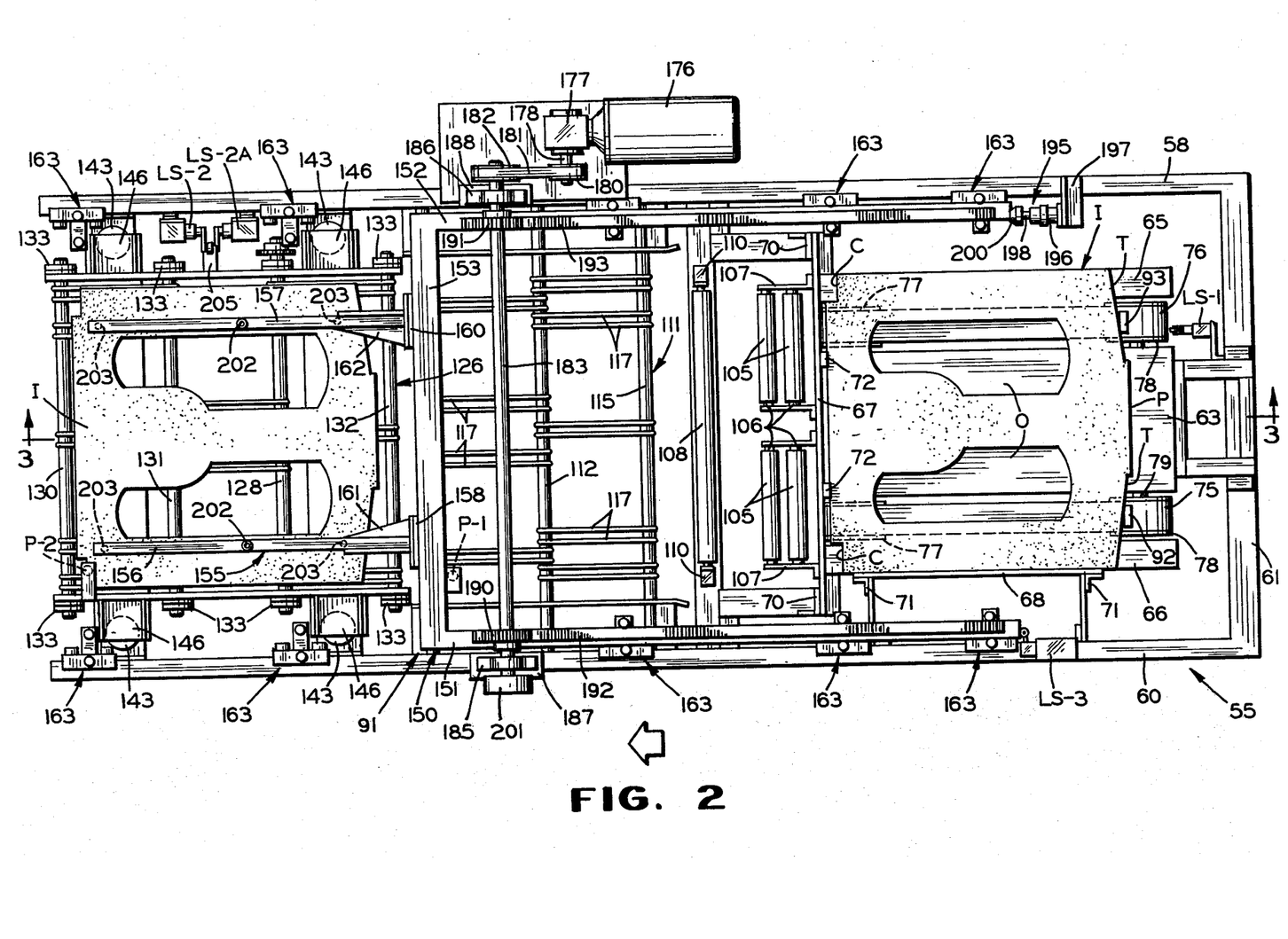
FIG. 2 is an enlarged top plan view of the interleave positioning apparatus constructed in accordance with this invention.
Figure 3:
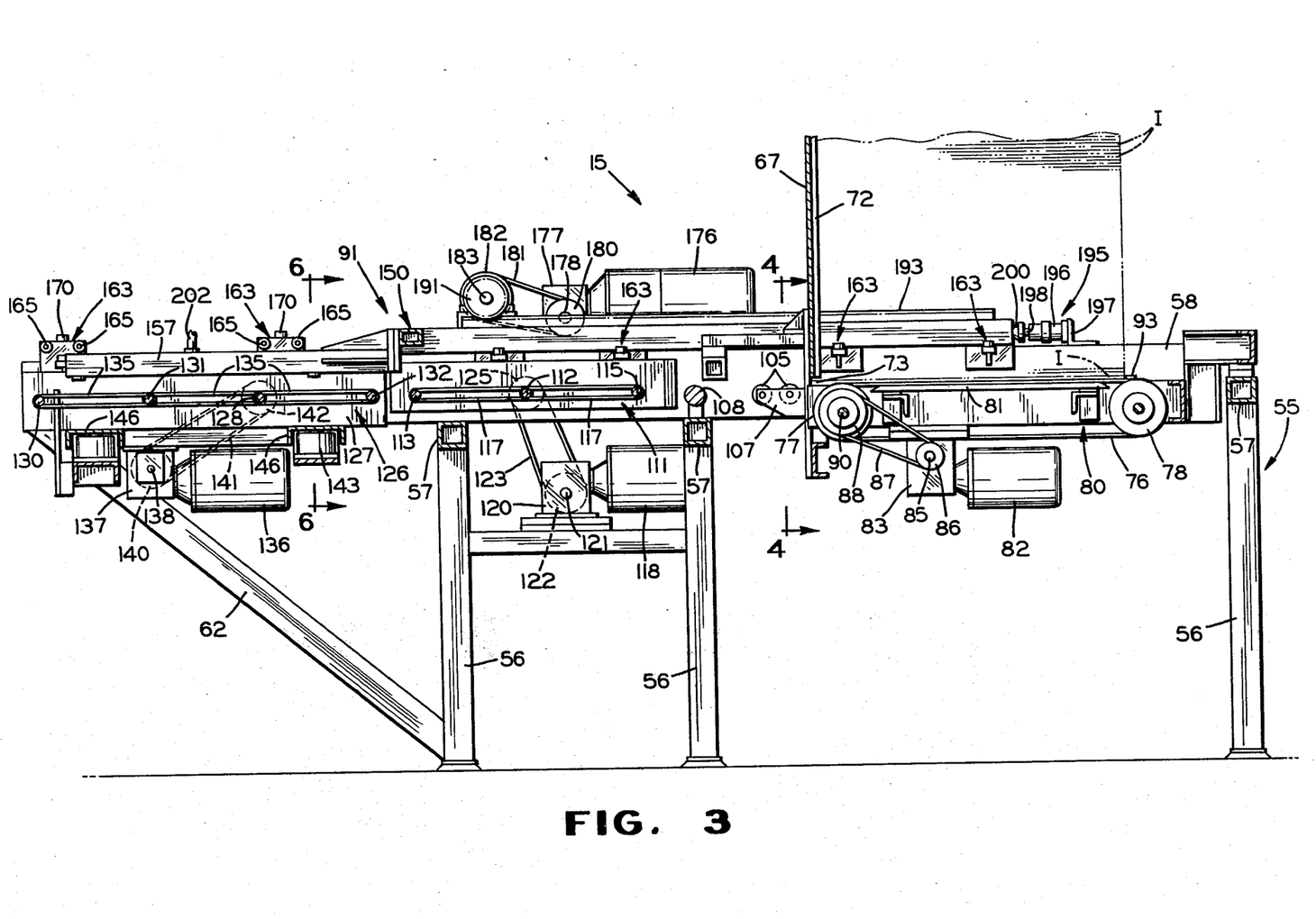
FIG. 3 is a vertical sectional view, taken along line 3—3 of FIG. 2.
Figure 4:
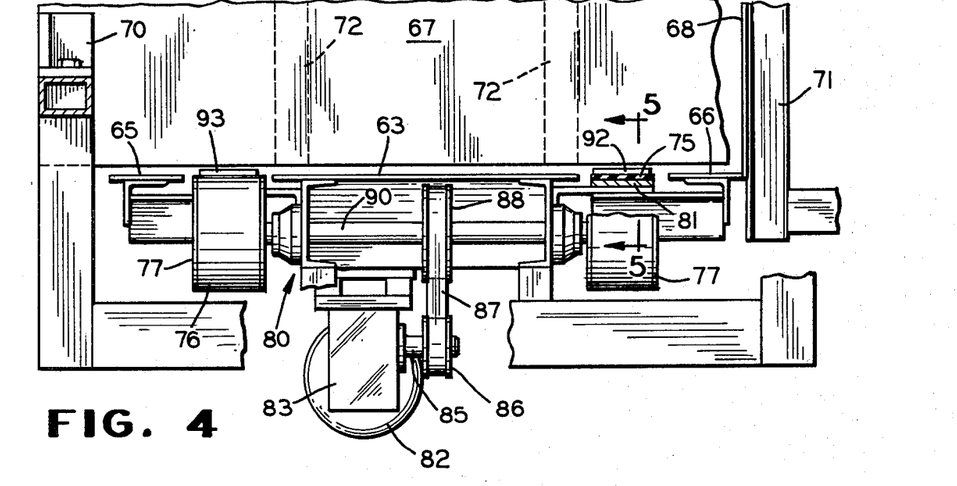
FIG. 4 is a fragmentary vertical sectional view, on an enlarged scale, taken along the line 4—4 of FIG. 3.

The present invention addresses this problem by providing the hereinbefore mentioned apparatus 15, constructed in accordance with this invention, for automatically placing a single interleave I on top of a windshield as it reaches the take-off end 11 of conveyor 12. As best shown in FIGS. 2 and 3, apparatus 15 comprises a frame 55 including a plurality of upstanding legs or posts 56 connected at their upper ends by transversely extending structural cross-members 57, in turn rigidly secured to and supporting a generally U-shaped frame formed of a pair of laterally spaced, longitudinally extending structural members 58 and 60 connected at their rear ends by a transversely extending structural member 61. For purposes of this description, the forward end of apparatus 15 will be taken as the left end thereof as viewed in FIGS. 2 and 3. The unsupported forward ends of members 58 and 60 are structurally sustained by brace members 62.

The specific plastic interleave I employed in the illustrative embodiment depicted is of generally square configuration in plane (FIGS. 2 and 7) having straight side edges and a straight front edge formed with rectangular cut-outs C at the juncture of the front edge with the side edges. The rear edge of the interleave is formed with tapered portions T extending rearwardly from the side edges and joined by a straight central portion P. The outline configuration of the interleave can vary, as desired, the important feature being that suitable openings O be formed therein to permit passage of the transporting frame vacuum 36–40 therethrough when picking up the windshield W from the conveyor 12.

A bottom support plate 63 (FIG. 2) is suitably mounted on the frame 55 for supporting the central portion of a stack of interleaves I. Also, a pair of outer bottom support plates 65 and 66, secured to the frame 55 in laterally spaced relation to the opposite sides of plate 63, support the marginal side portions of the stack. An upright front plate 67 and an upright side plate 68 are suitably secured, as by brackets 70 and 71, respectively, to the frame 55 for containing the stack of interleaves I in place. The inner face of front plate 67 is provided with laterally spaced, vertically extending Teflon strips 72 to provide anti-friction surfaces allowing the stack to slide downwardly by gravity as individual interleaves are removed from the bottom of the stack. The bottom of the front plate 67, as well as strips 72, are spaced slightly from the support plates 63, 65 and 66 to define an opening 73 (FIG. 5) slightly greater than the thickness of an interleave I to allow passage of the lowermost interleave therethrough.

The spaces between central support plate 63 and side support plates 65,66 accommodate the active runs of a pair of endless conveyor belts 75 and 76 of a rearward conveyor section 74 and movable in an endless orbital path about driver pulley 77 and idler pulleys 78, the latter being suitably mounted on a common idler shaft 79 supported on the conveyor frame 80. These active conveyor runs are supported on plates 81 (FIG. 3) mounted on the conveyor frame and are maintained in the same horizontal plane as the central support plate 63 and side support plates 65 and 66 and offer support, along with these plates, for the stack of interleaves I. The means for rotating the driven pulleys 77 includes an electric motor 82 connected to a suitable source of power (not shown) and, via gear reduction mechanism 83, to an output shaft 85 having a drive pulley 86 mounted thereon. A drive belt 87 is trained about the pulley 86 and a drive pulley 88 mounted on a drive shaft 90 upon which the laterally spaced conveyor belt pulleys 77 are mounted for rotation therewith.

Figure 5:
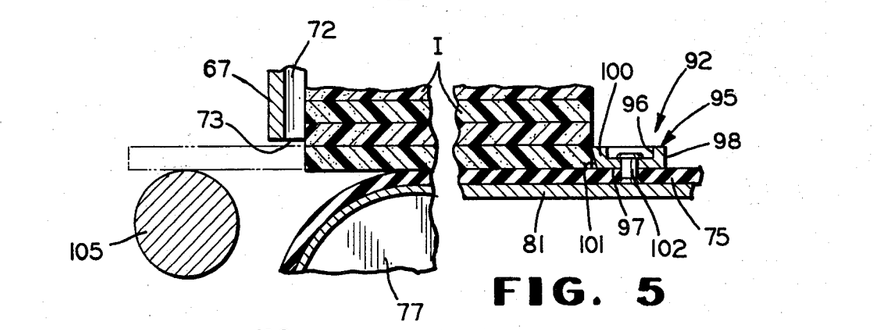
FIG. 5 is a fragmentary vertical sectional view, on an enlarged scale, taken along the line 5—5 of FIG. 4.

Means are provided for removing a single interleave I from the supply or stack of such interleaves and advancing the single interleave forwardly for ultimate pick-up by a carriage or shuttle 91, hereinafter described in detail. Such means comprises a pair of laterally spaced projections in the form of lugs 92 and 93 rigidly secured to the conveyor belts 75 and 76. As best shown in FIG. 5, each lug 92,93 comprises a generally rectangularly shaped body 95 having a recess 96 defined by a bottom wall 97, a rear wall 98 and a front wall 100 formed with an inclined face 101 extending upwardly from the bottom wall to the upper edge of front wall 100. Each lug is rigidly secured to its associated conveyor belt by a fastener 102 seated in the recess 96 and extending through the bottom wall 97 and into the belt. While the thickness of lugs 92,93 approximates the thickness of an interleave, preferably their thicknesses, as shown in FIG. 5, should be slightly thinner than the thickness of an interleave to assure engagement with the lowermost interleave only. Accordingly, the upper marginal edges of both lugs lie in a common horizontal plane disposed slightly below the upper planar face of the lowermost interleave of the stack. Both lugs 92 and 93 are disposed in lateral alignment so that movement of the belts 75,76 in unison brings the front faces 101 of these lugs into engagement with the lowermost interleave I to advance the same relative to the remainder of the stack through the opening 73, the remainder of the stack being restrained by front plate 67. Because of the light-weight construction of the interleaves, the total weight of the entire stack offers little frictional resistance to the removal of the lowermost interleave. Thus, individual interleaves are stripped or removed from the stack and advanced forwardly by means of the conveyor belt-lug arrangement.

Two sets of laterally spaced conveyor rolls 105 are mounted forwardly from plate 67 to receive the stripped interleave and advance the same forwardly. Each set consists of two longitudinally spaced conveyor rolls 105 freely rotatable on shafts 106 mounted at their opposite ends in brackets 107. The shorter legs of the brackets 107, in turn, are welded or otherwise fixedly secured to the front plate 67. A single, elongated, transversely extending conveyor roll 108 is located just shortly downstream from the conveyor rolls 105 to assist in advancing the interleave I forwardly. Conveyor roll 108 is journalled for free rotation at its opposite ends in bearing blocks 110.

An intermediate conveyor section, generally designated 111, is located downstream of conveyor roll 108 for receiving the interleave therefrom and positively advancing it further toward the shuttle pick-up station. This intermediate conveyor section 111 comprises a drive shaft 112 located intermediate a forward shaft 113 (FIG. 3) and a rear shaft 115. The several shafts 112, 113 and 115 are formed with peripheral grooves 116 (FIG. 6) for receiving a plurality of O-rings formed to function as endless conveyor belts 117. Shaft 112 serves as the common drive for these belts 117 with certain of them being trained about drive shaft 112 and shaft 113 while the others are trained about drive shaft 112 and shaft 115. The O-ring belts 117 are formed of a relatively soft, resiliently yieldable material to provide the necessary traction for advancing the fragile, lightweight interleaves thereon.

The means for rotating shaft 112 and thereby the many O-ring belts 117 includes electric motor 118 connected to a suitable source of electrical power (not shown) and, via gear reduction mechanism 120, to an output shaft 121 having a drive pulley 122 mounted thereon. A drive belt 123 is entrained about the drive pulley 122 and a driven pulley 125 mounted on the drive shaft 112.

A forward conveyor section, generally designated 126, is located downstream of the intermediate conveyor section 111 for receiving the advancing interleave I and moving the same further toward its pick-up position. The conveyor section 126 is mounted on a vertically reciprocal carriage 127 and includes a drive shaft 128 and three driven shafts 130, 131 and 132 all suitably journalled at their respective opposite ends in bearing blocks 133. These several shafts 128 and 130-132 also are formed with peripheral grooves to receeove O-ring type belts 135. As best shown in FIG. 3, certain of the belts 135 are trained about drive shaft 128 and the rearward shaft 132. Other belts are trained about drive shaft 128 and the intermediate shaft 131, while the remaining belts are trained about shaft 131 and the forward shaft 130. The power transmitted to shaft 131 by belts 135 is further transmitted by the forward group of belts to shaft 130. The drive train for rotating drive shaft 128 includes an electric motor 136 for rotating, via gear reduction mechanism 137, an output shaft 138 having a drive pulley 140 mounted thereon. A drive belt 141 is entrained about the drive pulley 140 and the driven pulley 142 suitably secured to the drive shaft 128. Thus, the single interleave I stripped from the stack of interleaves is moved therefrom and advanced successively onto the idler rolls 105 and 108, intermediate conveyor section 111 and forward conveyor section 126 to its ultimate pick-up position.

The means for vertically reciprocating carriage 127 includes four "pancake" type fluid cylinders 143 suitably mounted below the carriage deck and provided with the usual pistons (not shown) connected to piston rods 145. The distal ends of the piston rods 145 engage structural extensions 146 forming a part of the carriage 127 and extending laterally outwardly therefrom. When the advancing interleave I reaches the end of its travel on conveyor section 126, these cylinders 143 are actuated to extend their respective piston rods 145 and raise the carriage to lift the interleave I to its proper upper position for removal by the pick-up head of the shuttle 91 as will hereinafter be described in detail.

The shuttle 91 comprises a frame 150 of generally U-shaped configuration in plan having a pair of longitudinally extending side members 151 and 152 and a transversely extending cross member 153, the open end of the frame 150 facing the rear end of apparatus 15. A pick-up head, generally designated 155, is connected to the front end of frame 150 and comprises a pair of laterally spaced, longitudinally extending, cantilevered, horizontal gripping arms 156 and 157 welded or otherwise fixedly secured at their rear ends to mounting brackets 158 and 160 rigidly affixed to the cross member 153 of frame 150. Suitable gusset members 161 and 162 are fixed to the arms 156 and 157 and their respective mounting brackets 158 and 160 for stability and rigidity.

Figure 6:
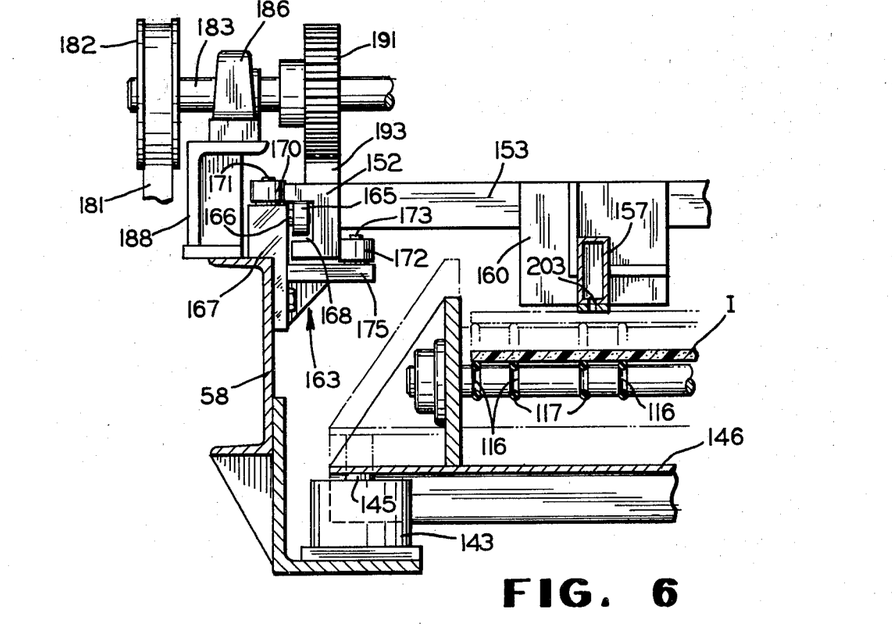
FIG. 6 is a fragmentary vertical sectional view, on an enlarged scale, taken along the line 6—6 of FIG. 3.

Shuttle 91 is mounted for longitudinal reciprocal movement relative to the frame of apparatus 15 between an interleave pick-up position shown in FIGS. 1 and 2 and an interleave deposit position shown in FIG. 7 and in phantom in FIG. 1. The shuttle 91 is supported and guided for rectilinear movement by a series of roller assemblies, generally designated 163, located in paired lateral alignment and longitudinally spaced relation along the length of longitudinal members 58 and 60 of apparatus frame 55. As best shown in FIG. 6, each roller assembly 163 includes a pair of longitudinally spaced, anti-friction rollers 165 (only one of which is shown in FIG. 6) mounted on horizontal stub shafts 166 secured to a bracket 167 bolted to the longitudinal structural member 58. The rollers 165 are disposed within a channel 168 formed in each of the U-frame side members 151 and 152. These longitudinally spaced rollers 165 along members 58 and 60 of frame 55 support the U-shaped frame 155 for smooth and easy sliding movement relative to apparatus frame 55. A third roller 170 is mounted on a vertically extending stub shaft 171 secured to the top of bracket 167. A fourth roller 172 is mounted on a vertical stub shaft 173 secured to a horizontal brackets 175 extending inwardly from bracket 171. Roller 170 engages the upper outside surface of side member 152 while the roller 172 engages the lower inner surface thereof to guide the U-shaped frame 155 in a straight rectilinear path.

The means for moving the shuttle 91 includes an electrical motor 176 connected to a suitable source of electrical power (not shown) and, via gear reduction box 177, to an output shaft 178 provided with a drive pulley 180. An endless belt 181 is trained about the drive pulley 180 and a driven pulley 182 rigidly mounted on a transversely extending drive shaft 183 suitably journalled for rotation adjacent its opposite ends in bearing blocks 185 and 186 supported on brackets 187 and 188 mounted on the apparatus frame longitudinal members 58 and 60, respectively. Spaced pinion gears 190 and 191 are mounted on the shaft 183 in meshing engagement with gear racks 192 and 193 welded or otherwise fixedly secured to the upper surfaces of U-frame side members 151 and 152. Thus, energization of the motor 176 effects rotation of the shaft 183 and thereby pinion gears 190 and 191 in one direction to move the gear racks 192 and 193 and thereby shuttle 91 axially in the proper direction.

Rearward movement of the shuttle 91 is limited by shock absorbers, generally designated 195, comprising a cylinder 196 rigidly secured to a mounting bracket 197 affixed to the longitudinal structural member 58 of the apparatus frame 55. The cylinder 196 is provided with the usual reciprocal piston (not shown) connected to a piston rod 198 having a bumper pad 200 on the distal end thereof. The termination of forward movement of the shuttle 91 is determined by a pulse generator 201 operatively connected to the drive shaft 183 for the shuttle, the pulse generator 201 being effective to deenergize the motor 176 to stop the shuttle 91 when the pick-up head 155 is disposed in a predetermined desired final position above the windshield awaiting to be removed by the robot transporting frame 28.

The arms 156, 157 are formed of hollow structural members (FIGS. 2 and 6) having ports in the top walls thereof for receiving vacuum lines 202 (FIG. 3) connected to a suitable source of vacuum (not shown). The hollow gripping arms also are provided with longitudinally spaced openings 203 in the bottom walls thereof to provide a suction force for securing an interleave I thereto during the interleave pick-up operation.

Limit switches LS-1, LS-2, LS-2a and LS-3 and element sensing devices in the form of photoelectric cells P-1 and P-2 are provided to synchronize the operation of the apparatus 15 according to a predetermined sequence. Switch LS-1 is mounted on the transverse member 61 of the apparatus frame 55 and is actuated by the lug 93 on stripper belt 76. Limit switches LS-2 and LS-2a are mounted on the apparatus frame 55 at the forward conveyor section 126 and are actuated by a lug 205 projecting laterally outwardly from the carriage 127 for controlling vertical movement thereof. Limit switch LS-3 is mounted on the longitudinal member 60 and is actuated by the rear end of side member 151 of the shuttle 91. Photoelectric cells P-1 and P-2 are mounted on the apparatus frame 55 adjacent the leading ends of conveyor sections 111 and 126, respectively. The actuation and function of these several limit switches and photoelectric cells will be presently described in connection with the mode of operation of apparatus 15 described below.

In operation, as a windshield W advancing on conveyor 12 reaches its take-off position as determined by stops 18, motor 82 is energized to drive the stripper belts 75 and 76 in orbital paths in a generally counterclockwise direction as viewed in FIG. 3. The lugs 92 and 93 engage and strip from the stack the lowermost interleave I and advance the same forwardly and successively onto conveyor rolls 105 and 108. The stripper belts 75 and 76 are continuously driven until lug 93 on belt 76 trips limit switch LS-1 to trigger a signal, deenergizing motor 82 and stopping stripper belts 75 and 76.

The interleave I is next received on intermediate conveyor section 111 and advanced thereby until the leading edge of the interleave I interrupts the light beam of photoelectric cell P-1 to produce a signal deactivating intermediate conveyor section 111. The interleave I remains in this intermediate position until a signal is received from photocell P-2 indicating that the forward conveyor section 126 is cleared to receive the interleave. This signal also activates conveyor section 111 to advance the inverleave I forwardly onto the forward conveyor section 126. The interleave I continues to advance on the O-ring belts 135 until the leading edge thereof interrupts the light beam of photoelectric cell P-2 to produce a signal for deactivating the forward conveyor section 126 to stop the interleave I in the desired position for subsequent pick-up. This latter signal also triggers actuation of the several cylinders 143 to raise carriage 127 for bringing the interleave into engagement with the undersides of gripping arms 156 and 157 of pick-up head 155. As the carriage 127 approaches the upstroke, the lug 205 mounted thereon trips limit switch LS-2 to produce a signal stopping upward movement of carriage 127 and simultaneously applying a vacuum force through lines 202, the hollow gripping arms 156 and 157 and openings 203 therein to secure the interleave to gripping arms 156 and 157. The carriage 127 is then lowered and, as it approaches the end of its downstroke, lug 205 trips limit switch LS-2a to produce a signal stopping downward movement of carriage 127 to a position for receiving the next succeeding interleave, which may already be located on the intermediate conveyor section 111 awaiting clearance from photoelectric cell P-2.

This last-mentioned signal also energizes a timing mechanism controlling operation of the shuttle 91. The timing mechanism is so designed that after pick-up head 155 grips the interleave I, the motor 176 becomes operative to rotate shaft 183 and, via pinion gears 190, 191 and racks 192, 193, shift the shuttle 91 forwardly toward the windshield positioned on conveyor 12. The shuttle 91 moves forwardly a preset distance, as determined by pulse generator 201, to position the interleave I above the windshield as shown in phantom in FIG. 1.

The robot 20 then becomes operative to move transporting frame 28, which may already be in a "pounce" position above the windshield and the incoming interleave, downwardly for gripping the windshield. As the frame 28 moves downwardly, the bumper pads 51 engage the interleave I to dislodge the same from gripping arms 156 and 157 and deposit such interleave on the windshield W while the vacuum cups 36-40 pass through the interleave openings O into engagement with the upper surface of the windshield. The shuttle 91 is then retracted to its initial "home" or interleave pick-up position in readiness for the next succeeding interleave. As the shuttle 91 reaches the end of its return stroke, it trips limit switch LS-3 to produce a signal stopping rearward movement of the shuttle and conditioning a circuit for signaling the robot that the gripping arms 156 and 157 are out of the way, allowing the robot transporting frame 28 to move upwardly carrying the windshield and interleave therewith for placement on the buck 13 in a stacked relation. In the meantime, apparatus 15 is reactivated for repeated continuous cycling.

From the foregoing, it is apparent that the objects of the present invention have been fully accomplished. A novel apparatus is provided for automatically applying protective interleaves to finished sheet articles before transferring the same to another location in a stacked relation. The apparatus includes novel means for stripping a single interleave from a supply or stack of such interleaves and advancing the same by way of a series of conveyor arrangements to a position beneath the pickup head of a shuttle. The latter is operable to grip the interleave and advance it to a position above a sheet article for subsequent deposit thereon prior to transfer of the sheet article.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

We claim:

1. An apparatus for providing fragile sheet articles with interleaves comprising: a frame, means mounted on said frame for supporting a vertical stack of interleaves thereon, means for stripping the lowermost interleave from said stack and advancing said interleave longitudinally in a first horizontal path toward a forward location, a horizontally reciprocal shuttle having gripping means above said horizontal path, means at said location for raising said interleave from said first horizontal path into engagement with said gripping means, and means moving said shuttle longitudinally in a second horizontal path above said first horizontal path to position said interleave in vertical registry above the sheet article for subsequent deposit thereon.

2. Apparatus according to claim 1, wherein said advancing means comprises a series of conveyor sections for successively advancing said interleave in said first horizontal path from said stack to said forward location.

3. Apparatus according to claim 1, wherein said advancing means includes a conveyor section having a pair of conveyor belts disposed beneath said stack and forming a part of said supporting means, and said stripping means comprises a projection on each of said belts engageable with said lowermost interleave of said stack.

4. Apparatus according to claim 3, wherein each of said projections comprises a lug of generally rectangular configuration in plan having a thickness approximating the thickness of an interleave.

5. Apparatus according to claim 1, wherein said advancing means includes a vertically reciprocal conveyor section at said forward location, and means for elevating said conveyor section to lift said interleave into engagement with said gripping means.

6. Apparatus according to claim 1, wherein said gripping means comprises a pair of laterally spaced hollow arms having gripping surfaces provided with openings therein, and vacuum means including a source of vacuum connected to said hollow arms for establishing a vacuum force through said openings for securing said interleave to said gripping surfaces.

7. Apparatus according to claim 1, wherein said supporting means comprises a central support plate and a pair of side support plates laterally spaced from the opposite sides of said central support plate, and a pair of endless conveyor belts forming a pair of said advancing means having active runs interposed between said side support plates and said central support plate and disposed in the said horizontal plane as said support plates.

8. Apparatus according to claim 1, including means for containing said stack of interleaves and comprising a front wall and a side wall secured to said frame, said front wall spaced apave said supporting means a distance slightly greater than the thickness of a single interleave.

9. Apparatus according to claim 1 in combination with a transfer apparatus adapted to transfer said fragile sheet article from one location to another, said transfer apparatus having a pick-up head provided with means for dislodging said interleave from said gripping means when positioned above said sheet article to deposit said interleave onto said article.

10. A method of providing fragile sheet articles with interleaves comprising: providing a stack of interleaves, stripping the lowermost interleave from said stack and advancing said interleave longitudinally on a conveyor system in a first horizontal path to a forward location, lifting said interleave from said first horizontal path at said forward location upwardly to an upper level above said path, and advancing said interleave longitudinally in a second horizontal path above said first path to a position in spaced relation above said sheet article for subsequent deposit thereon.

11. A method according to claim 10, including gripping said interleave at said upper level before advancing said interleave in said second horizontal path.

12. A method according to claim 11, including releasing said interleave to deposit said interleave on said sheet article.

* * * * *

UNITED STATES PATENT AND TRADEMARK OFFICE
CERTIFICATE OF CORRECTION

PATENT NO. : 4,413,820

DATED : November 8, 1983

INVENTOR(S) : James A. Meeker and Christopher J. Jackson

It is certified that error appears in the above-identified patent and that said Letters Patent are hereby corrected as shown below:

```
Col. 2, line 67,"the hollor"should be --hollow--
Col. 3, line 56, "plane" should be --plan--
Col. 4, line 22, "driver pulley" should be --drive pulleys--
        line 35, "drive" (1st occurrence) should be --driven--
Col. 5, line 53, "receove" should be --receive--
Col. 8, line 5, "inverleave" should be --interleave--
Col. 10, line 12, "pair" should be --part--
         line 15, "said" (1st occurrence) should be --same--
         line 19, "apave" should be --above--
```

Signed and Sealed this

Fourteenth Day of February 1984

[SEAL]

Attest:

GERALD J. MOSSINGHOFF

Attesting Officer     Commissioner of Patents and Trademarks